United States Patent
Ono et al.

(10) Patent No.: US 9,440,642 B2
(45) Date of Patent: Sep. 13, 2016

(54) DRIVE SYSTEM FOR HYBRID VEHICLE

(71) Applicants: Tomohito Ono, Susono (JP); Takahito Endo, Suntou-gun (JP); Yuji Iwase, Mishima (JP)

(72) Inventors: Tomohito Ono, Susono (JP); Takahito Endo, Suntou-gun (JP); Yuji Iwase, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/646,262

(22) PCT Filed: Nov. 26, 2012

(86) PCT No.: PCT/JP2012/080505
§ 371 (c)(1),
(2) Date: May 20, 2015

(87) PCT Pub. No.: WO2014/080528
PCT Pub. Date: May 30, 2014

(65) Prior Publication Data
US 2015/0298685 A1    Oct. 22, 2015

(51) Int. Cl.
| | |
|---|---|
| B60K 6/38 | (2007.10) |
| B60W 20/00 | (2016.01) |
| B60K 6/445 | (2007.10) |
| B60K 6/383 | (2007.10) |
| B60W 10/02 | (2006.01) |
| B60K 6/365 | (2007.10) |
| B60W 10/08 | (2006.01) |
| B60W 10/10 | (2012.01) |
| B60K 6/387 | (2007.10) |
| B60W 10/30 | (2006.01) |

(52) U.S. Cl.
CPC ............ *B60W 20/108* (2013.01); *B60K 6/365* (2013.01); *B60K 6/383* (2013.01); *B60K 6/387* (2013.01); *B60K 6/445* (2013.01); *B60W 10/02* (2013.01); *B60W 10/08* (2013.01); *B60W 10/10* (2013.01); *B60W 10/30* (2013.01); *B60W 20/00* (2013.01); *B60W 20/15* (2016.01); *B60K 2006/381* (2013.01); *B60W 2900/00* (2013.01); *Y02T 10/6239* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 5,788,006 A | 8/1998 | Yamaguchi | |
| 5,993,169 A * | 11/1999 | Adachi | B60K 6/26 417/223 |

(Continued)

FOREIGN PATENT DOCUMENTS

| | | |
|---|---|---|
| JP | 3173319 | 6/2001 |
| JP | 2008-308138 A | 12/2008 |

(Continued)

OTHER PUBLICATIONS

International Search Report Issued Feb. 19, 2013 in PCT/JP12/080505 Filed Nov. 26, 2012.

*Primary Examiner* — Thomas Tarcza
*Assistant Examiner* — Garrett Evans
(74) *Attorney, Agent, or Firm* — Oblon, McClelland, Maier & Neustadt, L.L.P.

(57) ABSTRACT

A drive system for a hybrid vehicle includes a planetary gear unit, a first rotating machine connected to a sun gear of the planetary gear unit, an engine connected to a carrier of the planetary gear unit, a second rotating machine and drive wheels connected to a ring gear of the planetary gear unit, a regulating mechanism that regulates rotation of the carrier, a first running mode in which the vehicle runs using the second rotating machine as a power source, and a second running mode in which the vehicle runs using the first rotating machine and the second rotating machine as power sources while the regulating mechanism regulates rotation of the carrier. The carrier is rotated by the first rotating machine when the vehicle shifts from the first running mode to the second running mode.

6 Claims, 14 Drawing Sheets

(56) References Cited

U.S. PATENT DOCUMENTS

2012/0265387 A1* 10/2012 Hisada .................. B60K 6/383
                                                          701/22
2014/0194238 A1    7/2014 Ono et al.

FOREIGN PATENT DOCUMENTS

| | | |
|---|---|---|
| JP | 2012 224148 | 11/2012 |
| WO | 2013 014777 | 1/2013 |
| WO | 2014 033841 | 3/2014 |

\* cited by examiner

| EV RUNNING MODE | MG1 | MG2 | B | NOTES |
|---|---|---|---|---|
| MG2 DRIVE | × | ○ | × | MG2-EV/HV MODE |
| ↑ | × | ○ | (○) | MG2-EV MODE |
| MG1&MG2 BOTH DRIVE | ○ | ○ | ○ | BOTH MG-EV MODE |

| | BK | CL |
|---|---|---|
| MG2-EV | O | |
| BOTH MG-EV | O | O |
| HV-1 | O | |
| HV-2 | | O |
| HV-3 | | |

AXIAL DIRECTION

DRIVE SYSTEM FOR HYBRID VEHICLE

TECHNICAL FIELD

This invention relates to a drive system for a hybrid vehicle.

BACKGROUND ART

Conventionally, a hybrid vehicle that runs using two motors is known in the art. For example, in a hybrid vehicle in which an engine, an output shaft, and a generator motor are connected by a differential gear unit, driving force of the generator motor compensates for a shortage of driving force of an electric motor while the engine is stopped, according to a technology disclosed in Patent Document 1.

PRIOR ART DOCUMENT

Patent Document 1: Japanese Patent No. 3173319

SUMMARY OF THE INVENTION

Problem to be Solved by the Invention

When the hybrid vehicle runs with the engine stopped, insufficient lubrication may occur to a planetary gear unit.

An object of the invention is to provide a drive system for a hybrid vehicle which can curb or prevent insufficient lubrication of a planetary gear unit.

Arrangement for Solving the Problem

A drive system for a hybrid vehicle of the invention includes a planetary gear unit, a first rotating machine connected to a sun gear of the planetary gear unit, an engine connected to a carrier of the planetary gear unit, a second rotating machine and drive wheels connected to a ring gear of the planetary gear unit, a regulating mechanism that regulates rotation of the carrier, a first running mode in which the vehicle runs using the second rotating machine as a power source, and a second running mode in which the vehicle runs using the first rotating machine and the second rotating machine as power sources while the regulating mechanism regulates rotation of the carrier, and is characterized in that the carrier is rotated by the first rotating machine when the vehicle shifts from the first running mode to the second running mode.

In the drive system for the hybrid vehicle as described above, the regulating mechanism is preferably a friction engagement device.

In the drive system for the hybrid vehicle as described above, the regulating mechanism is preferably a one-way clutch.

In the drive system for the hybrid vehicle as described above, when the vehicle shifts from the first running mode to the second running mode, it is preferable to half-engage the friction engagement device and cause the first rotating machine to rotate the carrier.

In the drive system for the hybrid vehicle as described above, during running in the second running mode, it is preferable to half-engage the friction engagement device and rotate the carrier, based on at least one of a duration of the second running mode and a traveling distance in the second running mode.

Preferably, the drive system for the hybrid vehicle as described above further includes an oil pump that rotates in association with the carrier, and supplies a lubricating oil to the planetary gear unit. When the vehicle shifts from the first running mode to the second running mode, it is preferable to cause the first rotating machine to rotate the carrier, and cause the oil pump to supply the lubricating oil to the planetary gear unit.

Effect of the Invention

The drive system for the hybrid vehicle according to the invention has the first running mode in which the vehicle runs using the second rotating machine as the power source, and the second running mode in which the vehicle runs using the first rotating machine and the second rotating machine as power sources while the regulating mechanism regulates rotation of the carrier. When the vehicle shifts from the first running mode to the second running mode, the carrier is rotated by the first rotating machine. The drive system for the hybrid vehicle according to the invention provides an effect of curbing insufficient lubrication of the planetary gear unit.

MODES FOR CARRYING OUT THE INVENTION

In the following, a drive system for a hybrid vehicle according to one embodiment of the invention will be described in detail with reference to the drawings. It is, however, to be understood that this invention should not be limited to this embodiment. Also, constituent elements in the following embodiment include those that can be easily conceived by a person skilled in the art, or those that are substantially the same elements.

First Embodiment

Figure 1:
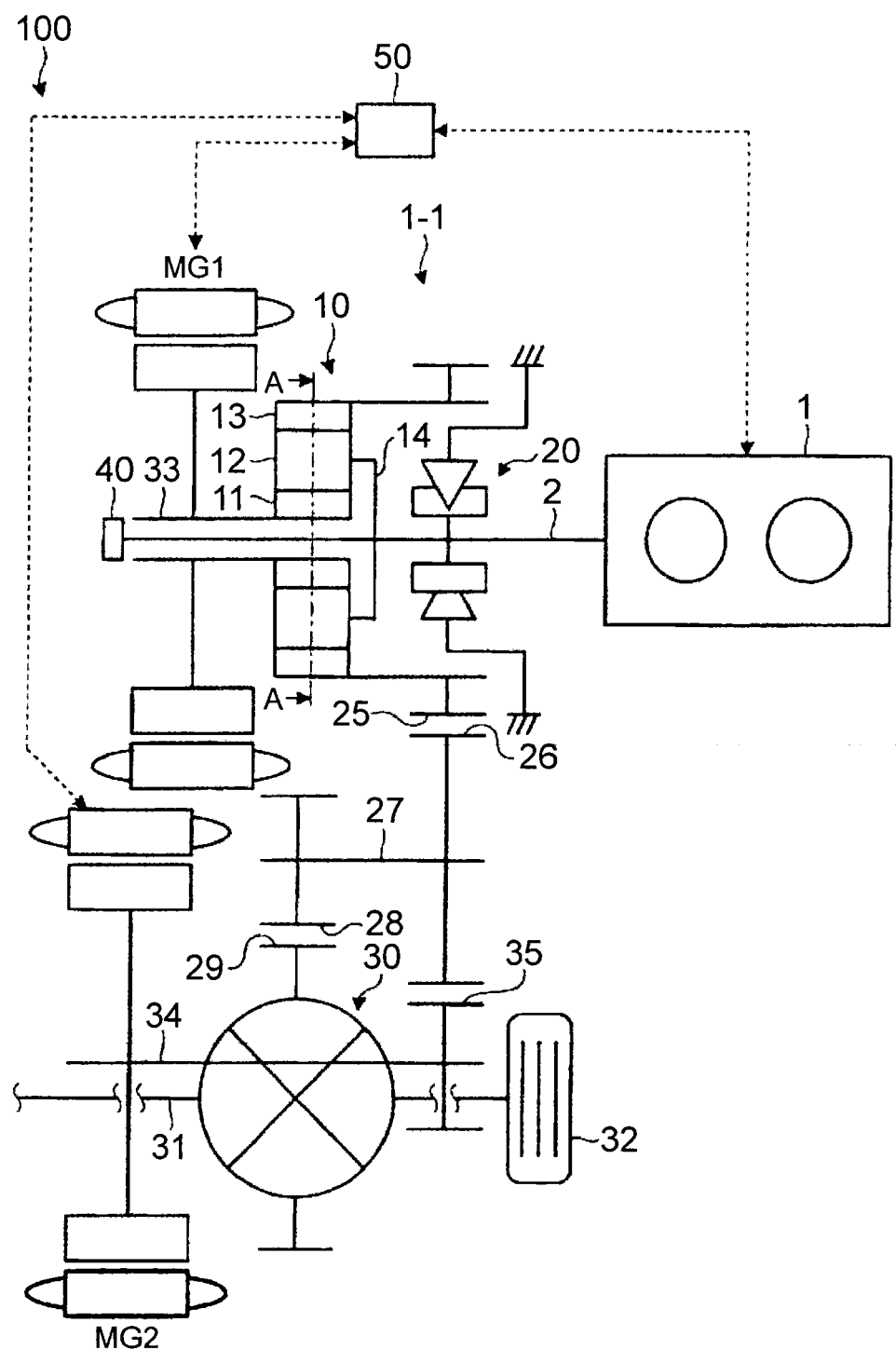
FIG. 1 is a skeleton diagram of a vehicle according to a first embodiment.
Figures 2, 3:
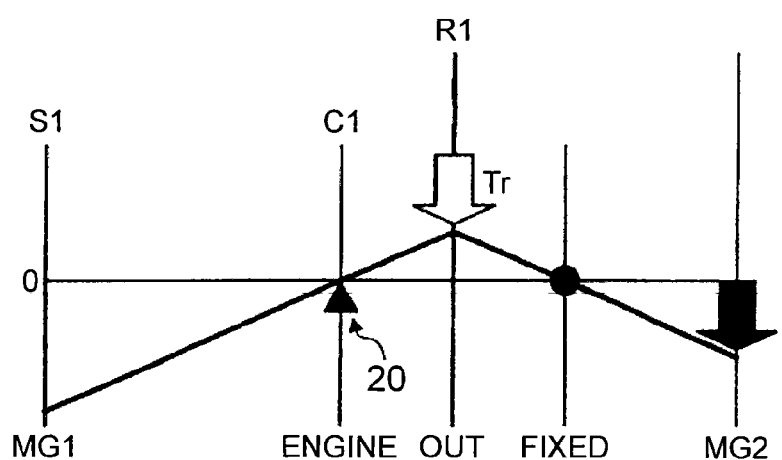
FIG. 2 is a view showing an operation engagement table of a drive system for a hybrid vehicle according to the first embodiment.
FIG. 3 is a nomographic chart concerning an MG2-EV running mode.
Figure 4:
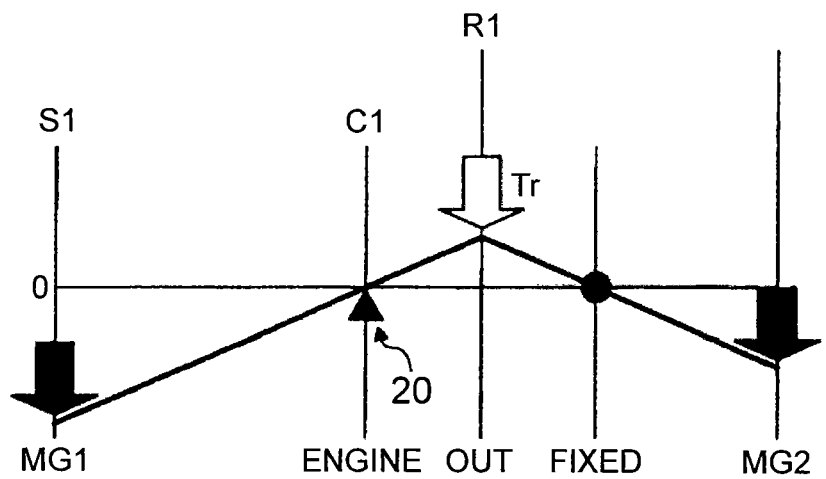
FIG. 4 a nomographic chart concerning a both MG-EV running mode.
Figure 5:
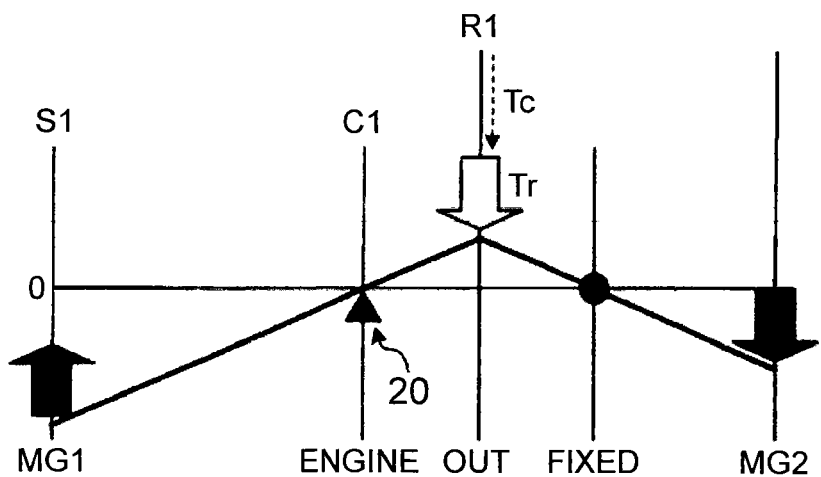
FIG. 5 is a nomographic chart at the time of starting of an engine.
Figure 6:
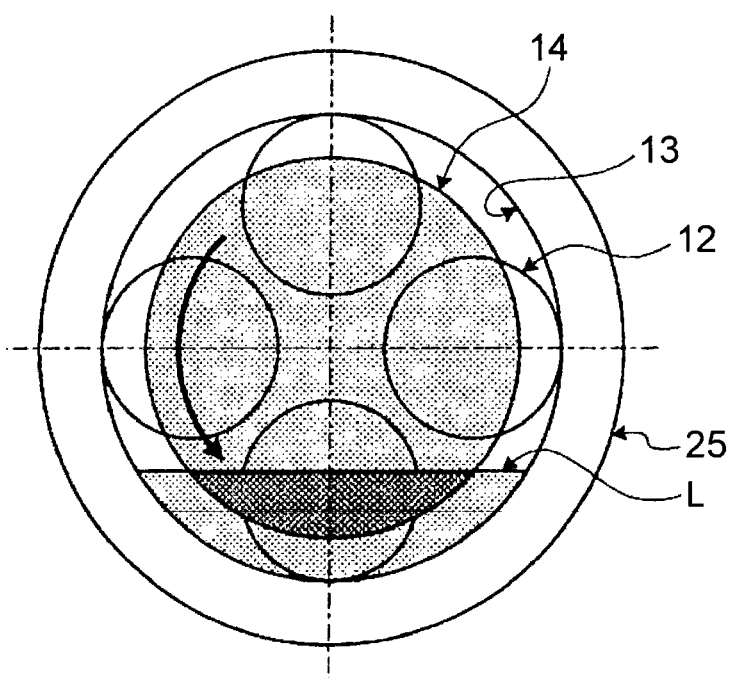
FIG. 6 is a cross-sectional view of a planetary gear unit.
Figure 7:
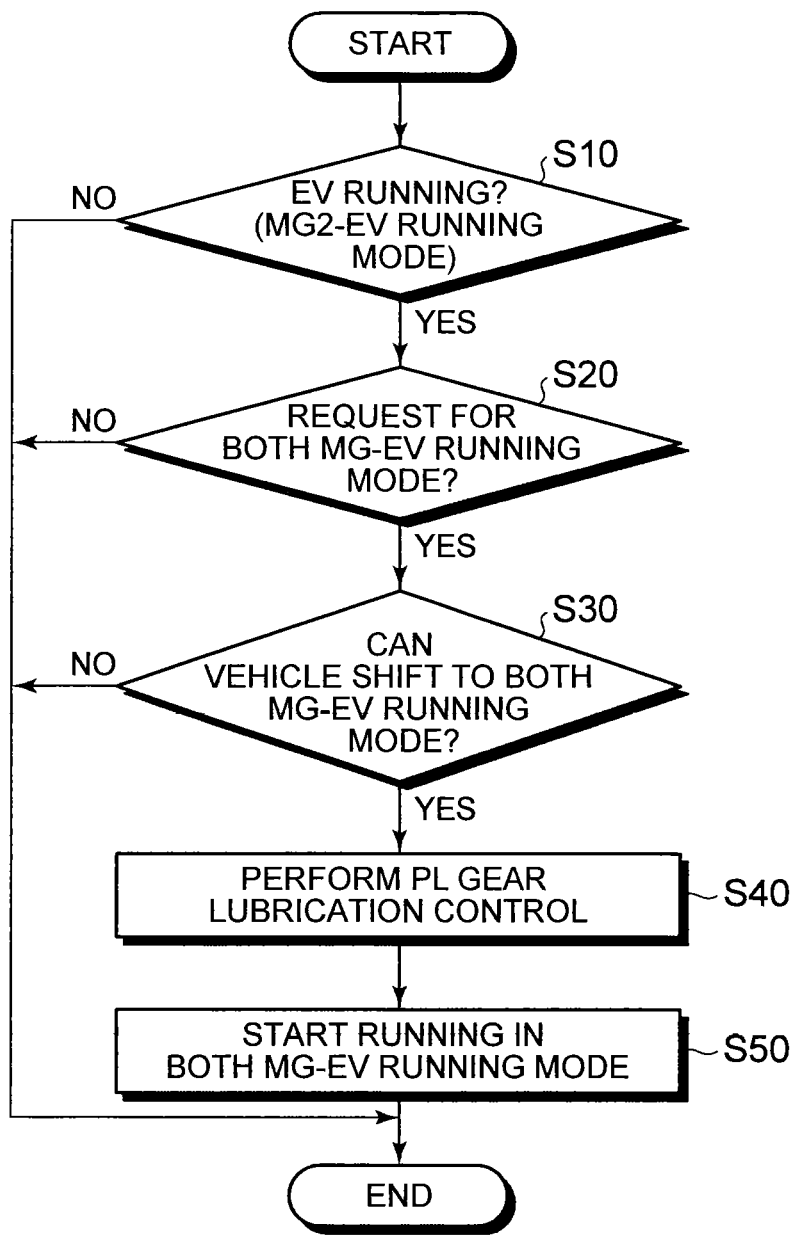
FIG. 7 is a flowchart concerning control of the first embodiment.
Figure 8:
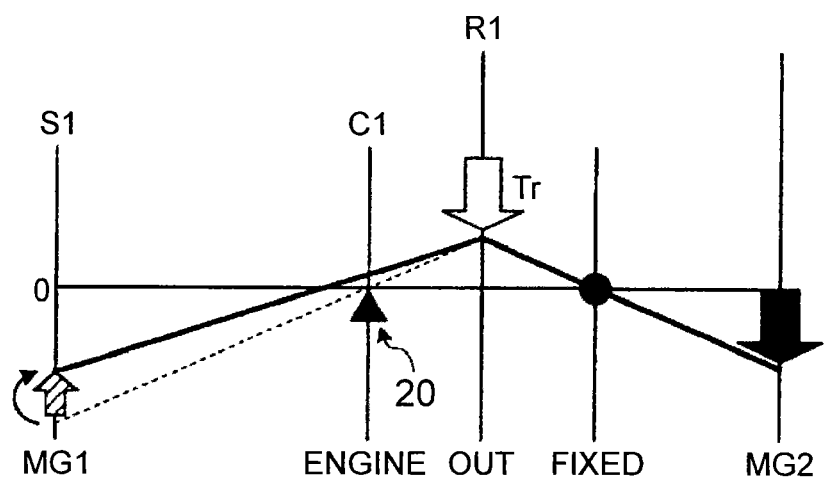
FIG. 8 is a nomographic chart showing lubricating operation performed by a first rotating machine MG1.
Figure 9:
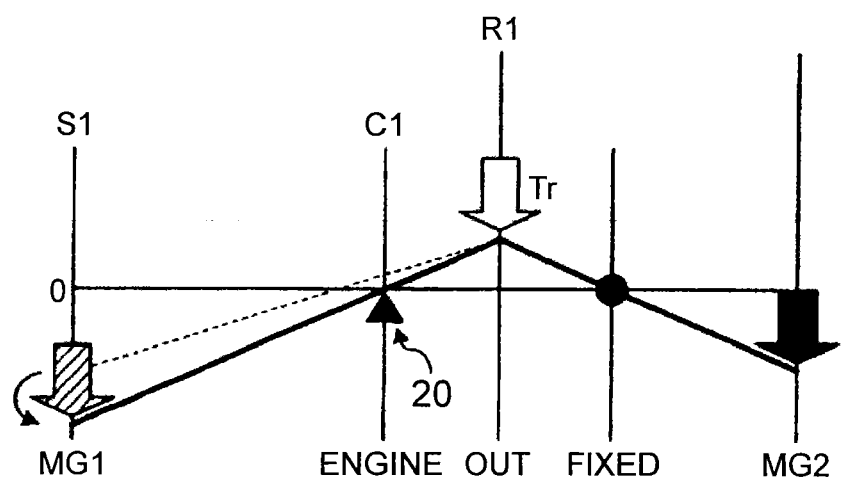
FIG. 9 is a nomographic chart showing a shift to the both MG-EV running mode.

Referring to FIG. 1 through FIG. 9, a first embodiment will be described. This embodiment relates to a drive system for a hybrid vehicle. FIG. 1 is a skeleton diagram of the vehicle according to the first embodiment, FIG. 2 is a view showing an operation engagement table of the drive system for the hybrid vehicle according to the first embodiment, FIG. 3 is a nomographic chart concerning an MG2-EV running mode, FIG. 4 is a nomographic chart concerning a both MG-EV running mode, FIG. 5 is a nomographic chart at the time of starting of an engine, FIG. 6 is a cross-sectional view of a planetary gear unit, FIG. 7 is a flowchart concerning control of the first embodiment, FIG. 8 is a nomographic chart showing lubricating operation performed by a first rotating machine MG1, and FIG. 9 is a nomographic chart showing a shift to the both MG-EV running mode.

The vehicle 100 according to this embodiment includes a one-way clutch (see reference numeral 20 in FIG. 1) that fixes an engine input element of a planetary gear unit (see reference numeral 10 in FIG. 1), and is installed with an HV system having a both MG-EV running mode in which the vehicle is driven with both the first rotating machine MG1, and a second rotating machine MG2 while the engine 1 is stopped and the one-way clutch 20 is fixed.

When there is a request for a shift from an MG-2 EV running mode in which the vehicle is driven with the second rotating machine MG2, to the both MG-EV running mode, the HV system is shifted to the both MG-EV running mode after a carrier (see reference numeral 14 in FIG. 1) of the planetary gear unit 10 is rotated by the first rotating machine MG1, and lubrication of pinion gears (see reference number 12 in FIG. 1) is ensured. In this manner, lubrication of the planetary gear unit 10 can be ensured.

As shown in FIG. 1, the vehicle 100 according to this embodiment is a hybrid vehicle (HV) having the engine 1, first rotating machine MG1 and the second rotating machine MG2, as power sources. The vehicle 100 may be a plug-in hybrid vehicle (PHV) that can be charged with power supplied from an external power supply. The vehicle 100 is configured to include the planetary gear unit 10, one-way clutch 20, and drive wheels 32, in addition to the above-indicated power sources.

Also, the drive system 1-1 for the hybrid vehicle according to this embodiment is configured to include the engine 1, planetary gear unit 10, first rotating machine MG1, second rotating machine MG2, one-way clutch 20, and the drive wheels 32. The drive system 1-1 for the hybrid vehicle may further include an oil pump 40 and an ECU 50. The drive system 1-1 for the hybrid vehicle can be used in an FF (front-engine, front-drive) vehicle, or an RR (rear-engine, rear-drive) vehicle, or the like. For example, the drive system 1-1 for the hybrid vehicle is installed on the vehicle 100 such that its axial direction corresponds to the vehicle width direction.

The engine 1 as an engine converts combustion energy of fuel into rotary motion of an output shaft, and delivers the rotary motion. The output shaft of the engine 1 is connected to an input shaft 2. The input shaft 2 is an input shaft of a power transmission system. The power transmission system is configured to include the first rotating machine MG1, second rotating machine MG2, planetary gear unit 10, one-way clutch 20, differential device 30, and so forth. The input shaft 2 is disposed coaxially with the output shaft of the engine 1, on an extended line of the output shaft. The input shaft 2 is connected to a carrier 14 of the planetary gear unit 10.

The planetary gear unit 10 is of a single pinion type, and has a sun gear 11, pinion gears 12, ring gear 13 and a carrier 14. The ring gear 13 is disposed on the same axis as the sun gear 11, radially outwardly of the sun gear 11. The pinion gears 12 are disposed between the sun gear 11 and the ring gear 13, and engage with the sun gear 11 and the ring gear 13, respectively. The pinion gears 12 are rotatably supported by the carrier 14. The carrier 14 is coupled to the input shaft 2, and rotates as a unit with the input shaft 2. Accordingly, the pinion gears 12 can rotate (orbit) about the center axis of the input shaft 2, along with the input shaft 2, and each of the pinion gears 12 can rotate about the center axis of the pinion gear 12 (rotate about itself) while being supported by the carrier 14.

A rotary shaft 33 of the first rotating machine MG1 is connected to the sun gear 11. A rotor of the first rotating machine MG1 is connected to the sun gear 11 via the rotary shaft 33, and rotates as a unit with the sun gear 11. A counter drive gear 25 is connected to the ring gear 13. The counter drive gear 25 is an output gear that rotates as a unit with the ring gear 13. The counter drive gear 25 is provided on an outer circumferential surface of a cylindrical member, and the ring gear 13 is provided on an inner circumferential surface thereof.

The counter drive gear 25 meshes with a counter driven gear 26. The counter driven gear 26 is connected to a drive pinion gear 28 via a counter shaft 27. The counter driven gear 26 and the drive pinion gear 28 rotate as a unit. Also, a reduction gear 35 meshes with the counter driven gear 26. The reduction gear 35 is connected to a rotary shaft 34 of the second rotating machine MG2. Namely, rotation of the second rotating machine MG2 is transmitted to the counter driven gear 26 via the reduction gear 35. The reduction gear 35, which has a smaller diameter than the counter driven gear 26, reduces the speed of rotation of the second rotating machine MG2, and transmits the rotation to the counter driven gear 26.

The drive pinion gear 28 meshes with a differential ring gear 29 of the differential device 30. The differential device 30 is connected to the drive wheels 32 via right and left drive axles 31. The ring gear 13 is connected to the drive wheels 32, via the counter drive gear 25, counter driven gear 26, drive pinion gear 28, differential device 30 and the drive axles 31. Also, the second rotating machine MG2 is connected to a power transmission path between the ring gear 13 and the drive wheels 32, and is able to transmit power to the ring gear 13 and the drive wheels 32, respectively.

Each of the first rotating machine MG1 and the second rotating machine MG2 functions as a motor (electric motor)

and also functions as a generator. The first rotating machine MG1 and the second rotating machine MG2 are connected to a battery via inverters. The first rotating machine MG1 and the second rotating machine MG2 can convert electric power supplied from the battery into mechanical power, and deliver the mechanical power, and can also convert mechanical power into electric power when driven by received power. The electric power generated by the rotating machines MG1, MG2 can be stored in the battery. As the first rotating machine MG1 and second rotating machine MG2, AC synchronous motor-generators may be used, for example.

The oil pump 40, which is connected to the engine 1 and the carrier 14, is a mechanical pump that is driven by rotation of the input shaft 2 to discharge lubricating oil. The oil pump 40 is disposed at an end portion of the input shaft 2 opposite to the engine 1 side, and rotates in accordance with rotation of the carrier 14. The lubricating oil delivered by the oil pump 40 is supplied to the planetary gear unit 10, first rotating machine MG1, engine 1, etc., so as to lubricate and cool the respective parts. The planetary gear unit 10 has oil passages that guide the lubricating oil supplied by the oil pump 40, etc. to the pinion gears 12, etc. Also, the drive system 1-1 for the hybrid vehicle has oil passages through which the lubricating oil fed upward (stirred up) by the differential ring gear 29 is supplied to respective parts. Through the above-mentioned oil passages, the lubricating oil is supplied to the planetary gear unit 10, first rotating machine MG1, second rotating machine MG2, and the engine 1, for example.

In the vehicle 100 of this embodiment, the one-way clutch 20, counter drive gear 25, planetary gear unit 10, first rotating machine MG1 and the oil pump 40 are arranged in this order as viewed from one side close to the engine 1, on the same axis as the engine 1. Also, the drive system 1-1 for the hybrid vehicle of this embodiment is of a plural-axis type in which the input shaft 2 and the rotary shaft 34 of the second rotating machine MG2 are located on different axes.

The ECU 50 functions as a control device for controlling the vehicle 100. The ECU 50 is an electronic control unit having a computer, and controls the engine 1, first rotating machine MG1, and the second rotating machine MG2. Also, the ECU 50 receives signals indicative of various kinds of information, such as information concerning the engine 1, information concerning the first rotating machine MG1, information concerning the second rotating machine MG2, information concerning the vehicle speed, information concerning the battery, and information concerning operational inputs, such as an accelerator pedal angle, received by operating devices.

The one-way clutch 20 is provided on the input shaft 2. The one-way clutch 20 is a regulating mechanism for regulating rotation of the carrier 14. Where the rotational direction of the input shaft 2 during operation of the engine 1 is referred to as the positive direction, the one-way clutch 20 permits rotation of the input shaft 2 in the positive direction, and inhibits rotation in the negative direction.

The vehicle 100 is able to selectively perform hybrid (HV) running or EV running. The HV running is a running mode in which the vehicle 100 runs using the engine 1 as a power source. In the HV running, the second rotating machine MG2 may be further used as a power source, in addition to the engine 1.

The EV running is a running mode in which the vehicle runs using at least one of the first rotating machine MG1 and the second rotating machine MG2 as a power source(s). In the EV running, the vehicle is able to run with the engine 1 stopped. The drive system 1-1 for the hybrid vehicle according to this embodiment has a first running mode and a second running mode as EV running modes. The first running mode is an EV running mode in which the vehicle 100 runs using the second rotating machine MG2 as a single power source. In this specification, the first running mode will also be called "MG2-EV running mode". The second running mode is an EV running mode in which the vehicle 100 runs using the first rotating machine MG1 and the second rotating machine MG2 as power sources while the one-way clutch 20 inhibits rotation of the carrier 14. In this specification, the second running mode will also be called "both MG-EV running mode".

In the engagement table of FIG. 2, "○" in some columns of the first rotating machine MG1 and the second rotating machine MG2 indicate that the rotating machine in question produces torque for running the vehicle, and "X" indicate that the rotating machine in question does not produce torque for running the vehicle, namely, the rotating machine does not produce torque, or produces torque for another purpose than running the vehicle, or operates to produce regenerative energy, for example. Also, in "B" columns indicating conditions of the one-way clutch 20, "○" denotes an engaged state, and "X" denotes a released state. Here, engagement or release of the one-way clutch 20 is not directly controlled, but takes place depending on a rotating condition of the input shaft 2.

In the HV mode, the engine 1 rotates, and the input shaft 2 rotates in the positive direction, so that the one-way clutch 20 is placed in the released state. The MG2-EV running mode shown in FIG. 3 may be implemented no matter which of the engaged and released states in which the one-way clutch 20 is placed. In each of the nomographic charts, S1 axis indicates the rotational speed of the sun gear 11 and the first rotating machine MG1. Also, C1 axis indicates the rotational speed of the carrier 14 and the engine 1, and R1 axis indicates the rotational speed of the ring gear 13. The rotational speed of the ring gear 13 is proportional to the rotational speed of the second rotating machine MG2 and the rotational speed of the drive axles 31. In the MG2-EV running mode, the output torque (MG2 torque) of the second rotating machine MG2 is used for driving the vehicle 100 against torque Tr of running resistance.

In the both MG-EV running mode shown in FIG. 4, the one-way clutch 20 is placed in the engaged state. In the both MG-EV running mode, the first rotating machine MG1 produces negative torque when the vehicle runs forward. The one-way clutch 20 is engaged to inhibit rotation of the carrier 14, so as to function to receive reaction force of output torque (MG1 torque) of the first rotating machine MG1, so that positive torque corresponding to the MG1 torque is delivered from the ring gear 13. The positive torque delivered from the ring gear 13 is transmitted to the drive wheels 32, so as to generate driving force for driving the vehicle 100 forward.

The ECU 50 can calculate required torque, required driving force, required power, and so forth, based on the accelerator pedal angle and the vehicle speed. The ECU 50 selects a mode to be executed, from the HV mode, MG2-EV running mode, and the both MG-EV running mode, based on the calculated required values, the state of charge SOC of the battery, etc. For example, the ECU 50 selects a running mode, based on a map, or the like, which defines the relationship among the vehicle speed, required driving force, and running mode regions.

(Engine Start)

When the engine 1 is started, the drive system 1-1 for the hybrid vehicle increases the rotational speed of the engine 1 using MG1 torque. As shown in FIG. 5, the first rotating machine MG1 delivers positive torque so as to increase the rotational speed of the engine 1. At this time, reaction force (engine start reaction force) torque Tc generated when the engine 1 is rotated/driven with MG1 torque is applied to the ring gear 13. The ECU 50 causes the second rotating machine MG2 to produce compensating torque against the engine start reaction force, in addition to torque for driving the vehicle forward, so as to reduce fluctuations in the driving force during starting of the engine.

When the vehicle runs in the EV running mode with the engine 1 stopped, rotation of the oil pump 40 is stopped, and therefore, the planetary gear unit 10 may suffer from insufficient lubrication. For example, when the vehicle runs in the MG2-EV running mode or both MG-EV running mode while the one-way clutch 20 is kept engaged, rotation of the input shaft 2 and the carrier 14 remains stopped, and the pinion gears 12 may not be adequately lubricated. In the both MG-EV mode, torque of the first rotating machine MG1 is applied to the pinion gears 12, which are thus subjected to a high load; nonetheless, the oil pump 40 is in a stopped state, and no lubricating oil is supped from the oil pump 40, which may result in insufficient lubrication.

When the drive system 1-1 for the hybrid vehicle according to this embodiment shifts from the MG2-EV running mode to the both MG-EV running mode, the first rotating machine MG1 is operated to rotate the carrier 14. In the planetary gear unit 10 according to this embodiment, the lubricating oil L is received or stored inside a space formed by the ring gear 13, as shown in FIG. 6. FIG. 6 shows an A-A cross-section of FIG. 1. For example, a bearing that rotatably supports the ring gear 13 is fitted on an inner circumferential surface of the cylindrical member having the ring gear 13. The bearing may provide a wall portion that permits the lubricating oil L to be stored in the ring gear 13. By rotating the carrier 14, it is possible to bring the pinion gears 12 into contact with the lubricating oil L stored in the ring gear 13, so as to lubricate pinion pins, pinion shafts, pinion bearings, etc. of the pinion gears 12. With the carrier 14 thus rotated at the time of the shift to the both MG-EV running mode, the respective pinion gears 12 are less likely or unlikely to suffer from insufficient lubrication.

Referring to FIG. 7 through FIG. 9, control of this embodiment will be described. A control flow shown in FIG. 7 is repeatedly executed at given intervals during running.

In step S10, the ECU 50 determines whether the vehicle is running in the MG2-EV running mode. If it is determined, as a result of the determination, that the vehicle is running in the MG2-EV running mode (step S10-Y), the control proceeds to step S20. If not (step S10-N), this control flow ends.

In step S20, the ECU 50 determines whether there is a request for the both MG-EV running mode. The ECU 50 makes an affirmative decision in step S20 when there is a request for a shift to the both MG-EV running mode. If it is determined, as a result of the determination in step S20, that there is a request for the both MG-EV running mode (step S20-Y), the control proceeds to step S30. If not (step S20-N), this control flow ends.

In step S30, the ECU 50 determines whether it is possible to shift to the both MG-EV running mode. For example, the ECU 50 determines whether it is possible to shift to the both MG-EV running mode, based on limits on the input and output of the battery, conditions of the first rotating machine MG1, etc. If it is determined, as a result of the determination in step S30, that it is possible to shift to the both MG-EV running mode (step S30-Y), the control proceeds to step S40. If not (step S30-N), this control flow ends.

In step S40, the ECU 50 performs lubrication control of the planetary gear unit 10. As shown in FIG. 8, the ECU 50 sets MG1 torque as positive torque, and changes the MG1 rotational speed in the positive direction. As a result, the carrier 14 rotates in the positive direction, and the pinion gears 12 rotate about the center axis of the planetary gear unit, as shown in FIG. 6. At this time, it is preferable to rotate the carrier 14 so that the carrier 14 makes a half turn to several turns. By rotating the carrier 14, it is possible to bring the pinion gears 12 that have not been immersed in the stored lubricating oil L into contact with the lubricating oil L. When the carrier 14 is rotated, the rotational speed of the carrier 14 may be detected, and the carrier 14 may be rotated by a target amount of rotation, or the carrier 14 may be rotated for a predetermined period of time.

If the carrier 14 is rotated so as to make at least one turn, all of the pinion gears 12 may be brought into contact with the stored lubricating oil L. Also, with the carrier 14 thus rotated, the rotational position (phase) of the pinion gears 12 about the input shaft 2 can be changed, and one of the pinion gears 12 can be prevented from remaining for a long time at a rotational position at which a high load is applied to the gear 12. If the lubrication control of the planetary gear unit 10 is performed in step S40, the control proceeds to step S50.

In step S50, the ECU 50 causes the vehicle to start running in the both MG-EV running mode. As shown in FIG. 9, the ECU 50 sets MG1 torque as negative torque, and reduces the rotational speed of the carrier 14, so that the rotational speed of the carrier 14 becomes equal to 0. In this connection, it is preferable to lower the rate of reduction of the rotational speed of the carrier 14, so as to reduce shock when the one-way clutch 20 is engaged. Once the one-way clutch 20 is engaged, the vehicle starts running in the both MG-EV running mode as shown in FIG. 4.

In the lubrication control of step S40, when the carrier 14 is rotated, the oil pump 40 is rotated/driven. The ECU 50 may cause the first rotating machine MG1 to rotate the carrier 14 until the lubricating oil supplied by the oil pump 40 reaches the pinion gears 12, so that the lubricating oil is supplied to the planetary gear unit 10 by means of the oil pump 40.

As described above, according to the drive system 1-1 for the hybrid vehicle according to this embodiment, the planetary gear unit 10 is less likely or unlikely to suffer from insufficient lubrication, and insufficient lubrication of the pinion gears 12, for example, is curbed. Also, a load is less likely or unlikely to be kept applied to one of the pinion gears 12. Thus, with the drive system 1-1 for the hybrid vehicle according to this embodiment, the durability of the planetary gear unit 10 can be improved.

Second Embodiment

Figure 10:
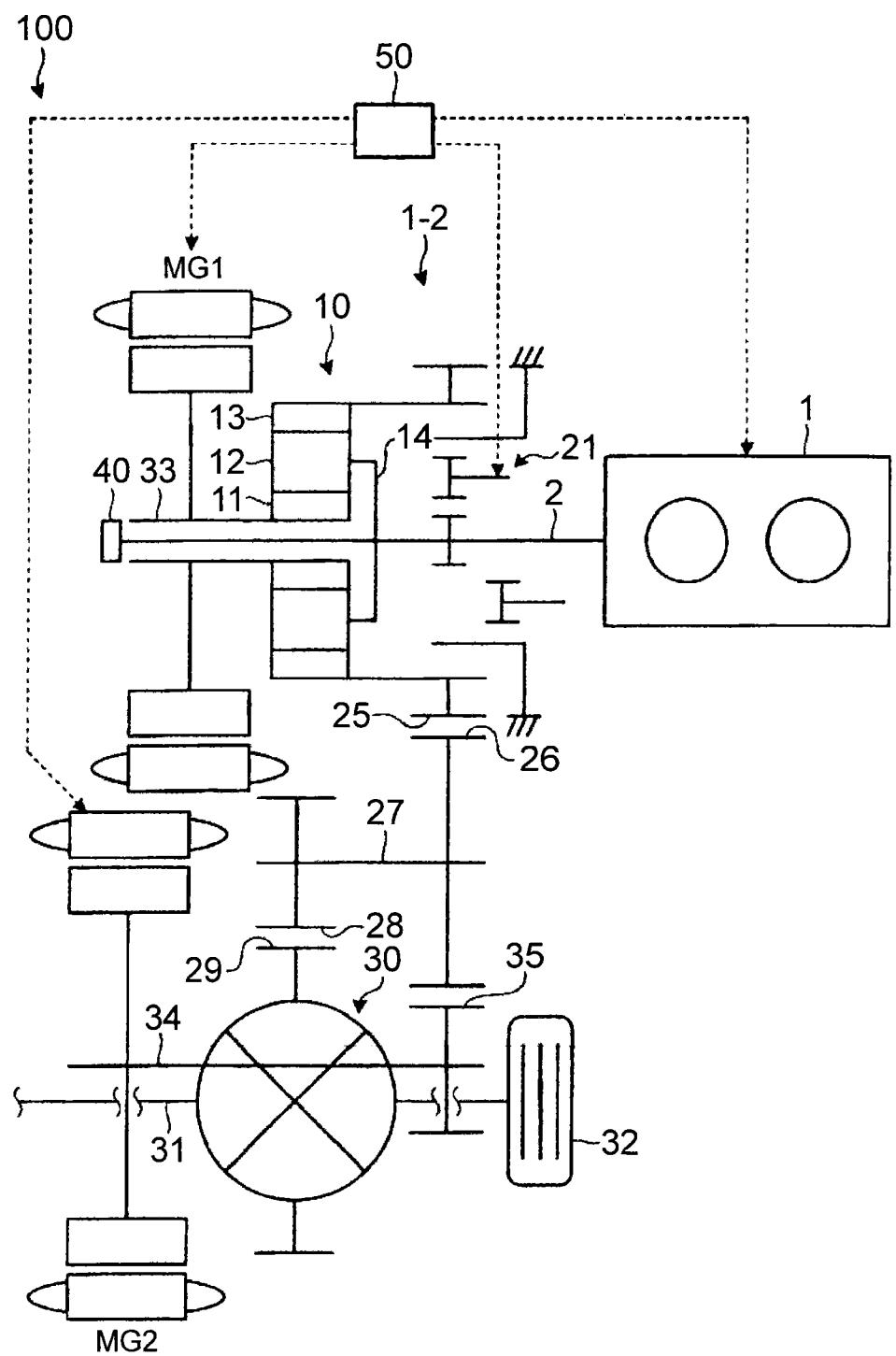
FIG. 10 is a skeleton diagram of a vehicle according to a second embodiment.

Referring to FIG. 10, a second embodiment will be described. In the second embodiment, the same reference numerals are assigned to constituent elements having substantially the same functions as those as described above in the first embodiment, and repeated explanation of these elements will be omitted or simplified. FIG. 10 is a skeleton diagram of a vehicle according to the second embodiment. A drive system 1-2 for a hybrid vehicle according to the second embodiment is different from the drive system 1-1 for the hybrid vehicle of the first embodiment in that a dog brake 21 is provided as a regulating mechanism, in place of the one-way clutch 20.

As shown in FIG. 10, the dog brake 21 is provided on the input shaft 2. The dog brake 21 is a mesh-type braking device, and engages the input shaft 2 with the vehicle body or release the input shaft 2 from the vehicle body. The dog brake 21 that is in an engaged state inhibits rotation of the input shaft 2 and the carrier 14. The dog brake 21 is controlled by the ECU 50.

In the running mode in which (O) denoting the engaged state appears in column "B" in the engagement table shown in FIG. 2, the dog brake 21 is engaged. The ECU 50 controls the rotational speed of the input shaft 2 to 0 by means of the first rotating machine MG1, for example, so as to engage the dog brake 21. Also, in the running mode in which (X) denoting the released state appears in column "B", the ECU50 releases the dog brake 21.

When the ECU 50 performs lubrication control of the planetary gear unit 10 when shifting from the MG2-EV running mode to the both MG-EV running mode, the ECU 50 causes the first rotating machine MG1 to rotate the carrier 14. When the dog brake 21 is engaged in the MG2-EV running mode, the dog brake 21 is released, and then the carrier 14 is rotated by the first rotating machine MG1. The direction of rotation of the carrier 14 may be the positive rotational direction or the negative rotational direction. The ECU 50 engages the dog brake 21 after rotating the carrier 14, so as to start the both MG-EV running mode.

Third Embodiment

Figure 11:
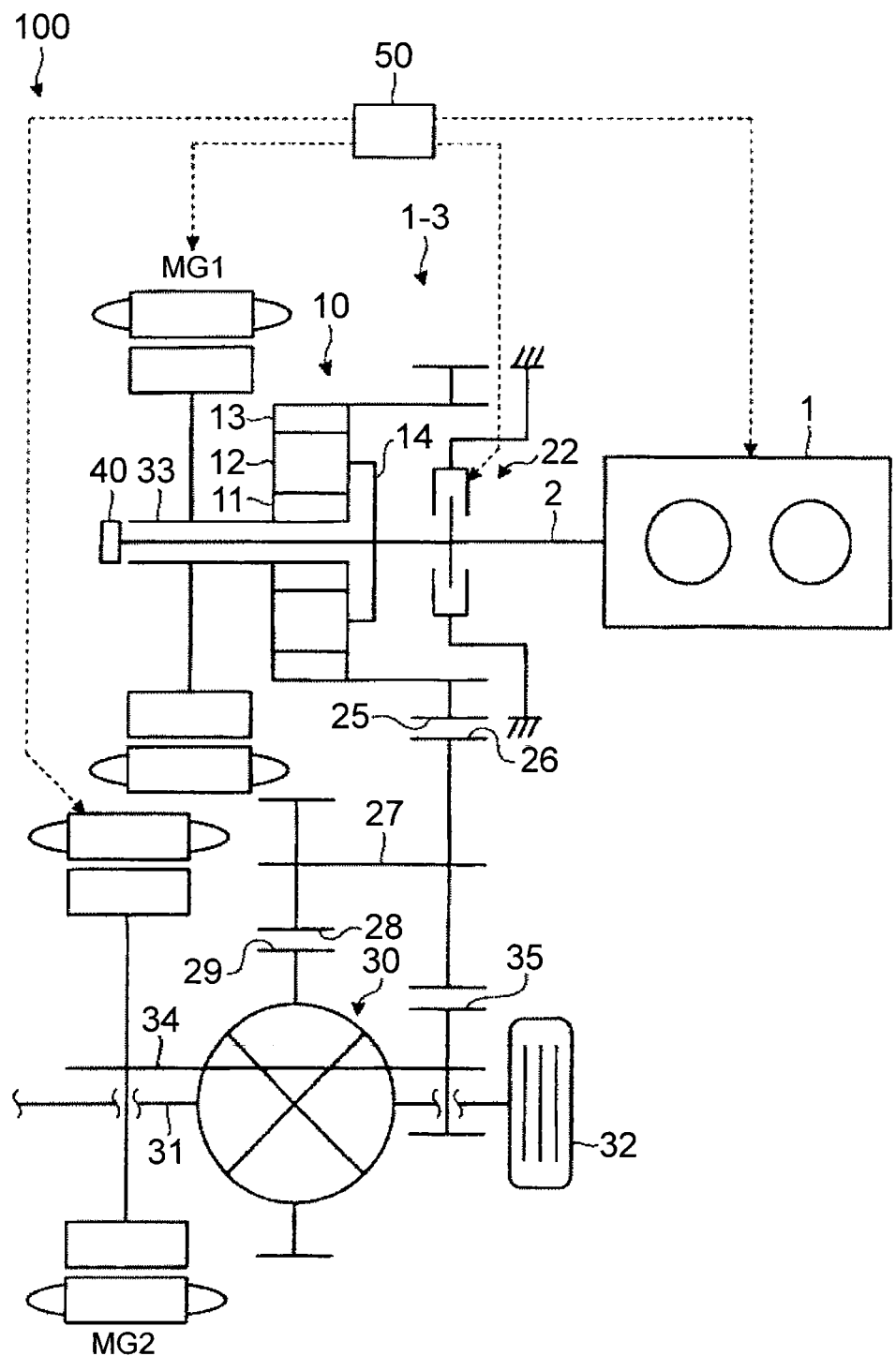
FIG. 11 is a skeleton diagram of a vehicle according to a third embodiment.

A third embodiment will be described. In the third embodiment, the same reference numerals are assigned to constituent elements having substantially the same functions as those as described above in each of the above-described embodiments, and repeated explanation of these elements will be omitted or simplified. FIG. 11 is a skeleton diagram of a vehicle according to the third embodiment. A drive system 1-3 for a hybrid vehicle according to the third embodiment is different from the drive system 1-1 for the hybrid vehicle of the first embodiment in that a friction brake 22 is provided as a regulating mechanism, in place of the one-way clutch 20.

As shown in FIG. 11, the friction brake 22 is provided on the input shaft 2. The friction brake 22 is a friction engagement device, and is of a wet type, for example. The friction brake 22 is a friction engagement type braking device, and engages the input shaft 2 with the vehicle body or releases the input shaft 2 from the vehicle body. The friction brake 22 that is in an engaged state inhibits rotation of the input shaft 2 and the carrier 14. The friction brake 22 is controlled by the ECU 50. In the running mode in which column "B" has an indication of "engaged" in the engagement table shown in FIG. 2, the friction brake 22 is engaged. In the running mode in which the same column has an indication of "released", the friction brake 22 is released.

When the ECU 50 performs lubrication control of the planetary gear unit 10 when shifting from the MG2-EV running mode to the both MG-EV running mode, the ECU 50 causes the first rotating machine MG1 to rotate the carrier 14. When the friction brake 22 is engaged in the MG2-EV running mode, the friction brake 22 is released, and then the carrier 14 is rotated by means of the first rotating machine MG1. The direction of rotation of the carrier 14 may be the positive rotational direction or the negative rotational direction. The ECU 50 engages the friction brake 22 after rotating the carrier 14, so as to start the both MG-EV running mode.

Fourth Embodiment

Figures 12, 13:
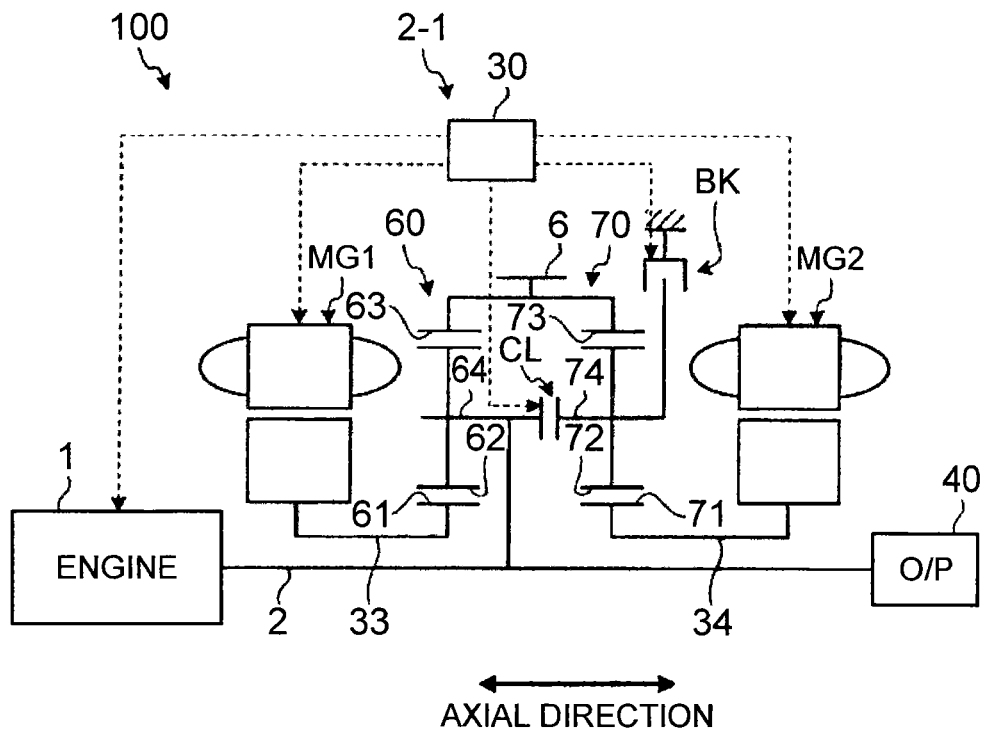
FIG. 12 is s a skeleton diagram showing a principal part of a vehicle according to a fourth embodiment.
FIG. 13 is a view showing an operation engagement table of a drive system for the hybrid vehicle according to the fourth embodiment.
Figure 14:
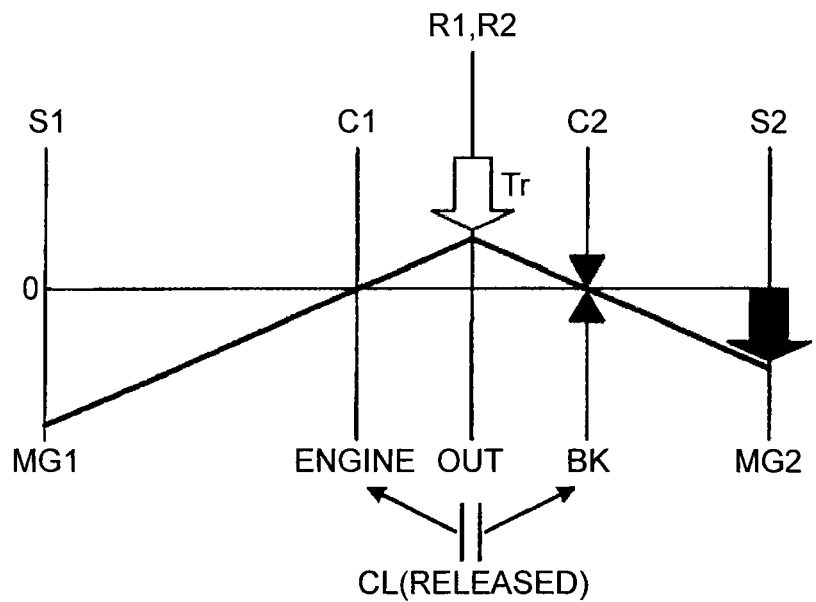
FIG. 14 is a nomographic chart of an MG2-EV running mode according to the fourth embodiment.
Figure 15:
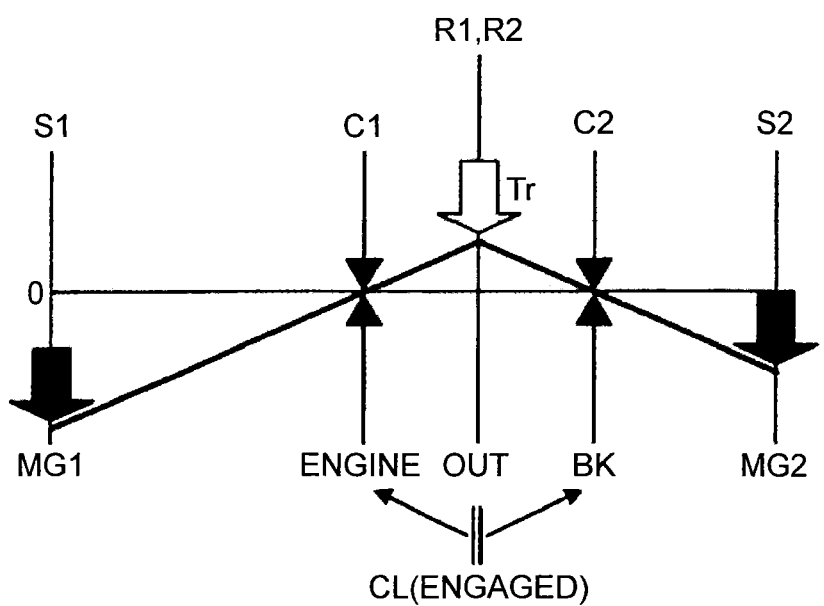
FIG. 15 is a nomographic chart of a both MG-EV running mode according to the fourth embodiment.
Figure 16:
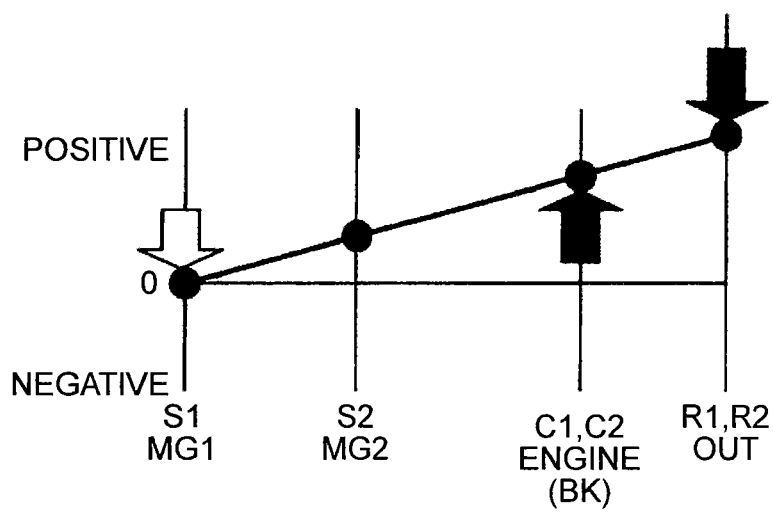
FIG. 16 is a nomographic chart of four elements when the vehicle runs in an HV-2 mode.
Figure 17:
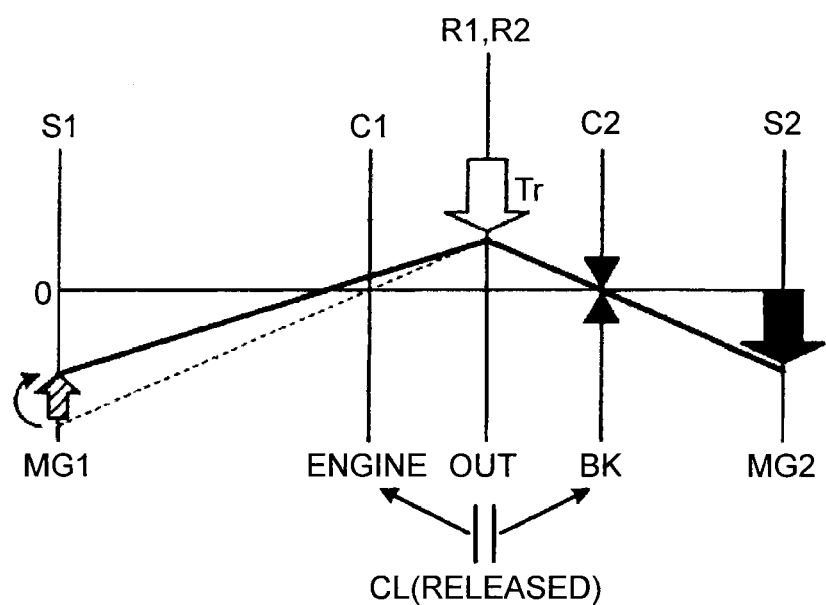
FIG. 17 is a nomographic chart indicating lubricating operation performed by a first rotating machine MG1.
Figure 18:
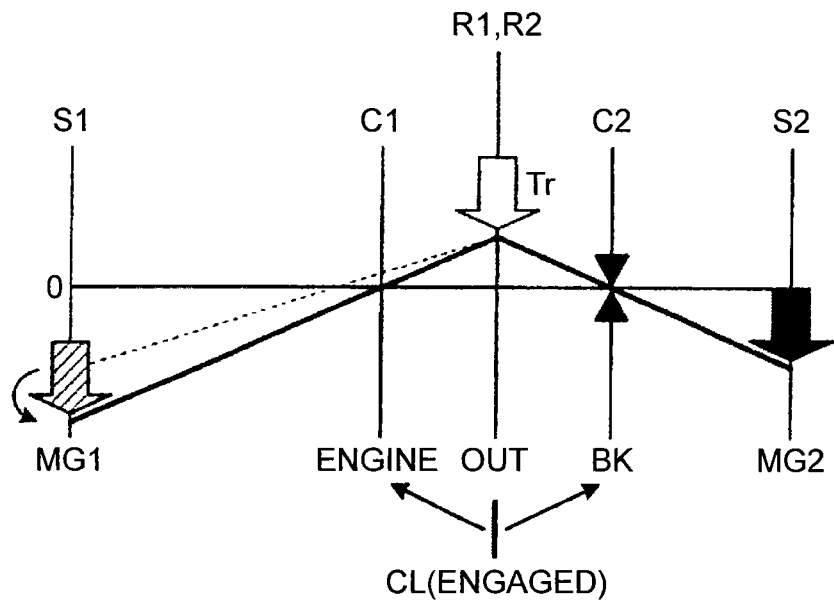
FIG. 18 is a nomographic chart indicating a shift to the both MG-EV running mode.

Referring to FIG. 12 through FIG. 20, a fourth embodiment will be described. In the fourth embodiment, the same reference numerals are assigned to constituent elements having substantially the same functions as those as described above in each of the above-described embodiments, and repeated explanation of these elements will be omitted or simplified. FIG. 12 is a skeleton diagram showing a principal part of a vehicle according to the fourth embodiment, FIG. 13 is a view showing an operation engagement table of a drive system for the hybrid vehicle according to the fourth embodiment, FIG. 14 is a nomographic chart of an MG2-EV running mode according to the fourth embodiment, FIG. 15 is a nomographic chart of a both MG-EV running mode according to the fourth embodiment, FIG. 16 is a nomographic chart of four elements when the vehicle runs in an HV-2 mode, FIG. 17 is a nomographic chart indicating lubricating operation by use of a first rotating machine MG1, and FIG. 18 is a nomographic chart indicating a shift to the both MG-EV running mode.

As shown in FIG. 12, the vehicle 100 is configured to include an engine 1, first rotating machine MG1, second rotating machine MG2, oil pump 40, first planetary gear unit 60, second planetary gear unit 70, clutch CL, and a brake BK. Also, the drive system 2-1 for the hybrid vehicle according to this embodiment is configured to include the first planetary gear unit 60, first rotating machine MG1 connected to a first sun gear 61, engine 1 connected to a first carrier 64, second rotating machine MG2 and drive wheels (not shown) connected to a first ring gear 63, and the clutch CL and brake BK that regulate rotation of the first carrier 64.

The drive system 2-1 for the hybrid vehicle according to this embodiment has a first running mode in which the vehicle runs using the second rotating machine MG2 as a power source, and a second running mode in which the vehicle runs using the first rotating machine MG1 and the second rotating machine MG2 as power sources while the clutch CL and the brake BK regulate rotation of the first carrier 64. The drive system 2-1 for the hybrid vehicle causes the first rotating machine MG1 to rotate the first carrier 64 when shifting from the first running mode to the second running mode.

Each of the first planetary gear unit 60 and the second planetary gear unit 70 is a single-pinion type planetary gear unit. The first planetary gear unit 60 has the first sun gear 61, first pinion gears 62, first ring gear 63, and the first carrier 64. The second planetary gear unit 70 has a second sun gear 71, second pinion gears 72, second ring gear 73, and a second carrier 74.

A rotary shaft of the engine 1 is connected to an input shaft 2. The input shaft 2 is connected to the first carrier 64 of the first planetary gear unit 60. The input shaft 2 and the first carrier 64 are connected to the second carrier 74 of the second planetary gear unit 70 via a clutch CL. The clutch CL is a clutch device that connects and disconnects the engine 1 and the first carrier 64 to and from the second carrier 74. The brake BK inhibits rotation of the second carrier 74 when it is engaged. With the clutch CL and the brake BK respectively engaged, rotation of the first carrier 64 is inhibited.

The first sun gear 61 is connected to a rotary shaft 33 of the first rotating machine MG1, and rotates as a unit with a rotor of the first rotating machine MG1. The first ring gear 63 is connected to the second ring gear 73, and rotates as a unit with the second ring gear 73. The second sun gear 71 is connected to a rotary shaft 34 of the second rotating machine MG2, and rotates as a unit with a rotor of the second rotating machine MG2. An output gear 6 is provided on outer circumferential surfaces of the first ring gear 63 and the second ring gear 73. The output gear 6 is connected to the drive wheels via a gear mechanism including a differential device, etc.

As shown in FIG. 13, the drive system 2-1 for the hybrid vehicle according to this embodiment has an MG2-EV running mode and a both MG-EV running mode as EV running modes. Also, the drive system 2-1 for the hybrid vehicle has three modes, i.e., an HV-1 mode, HV-2 mode, and an HV-3 mode, as HV running modes.

(MG2-EV Running Mode)

As shown in FIG. 13, in the MG2-EV running mode, the brake BK is engaged, and the clutch CL is released. As a result, as shown in FIG. 14, rotation of the second carrier 74 is inhibited. The second carrier 74 functions to receive reaction force against MG2 torque, so that the MG2 torque can be delivered from the second ring gear 73. The ECU 50 causes the second rotating machine MG2 to produce negative torque when running the vehicle forward, so that driving force is generated to run the vehicle 100 in the forward direction, against torque Tr of running resistance.

(Both MG-EV Running Mode)

As shown in FIG. 13, in the both MG-EV running mode, the brake BK and the clutch CL are engaged. As a result, as shown in FIG. 15, rotation of the first carrier 64 and the second carrier 74 is inhibited. The first carrier 64 functions to receive reaction force against MG1 torque, so that the MG1 torque can be delivered from the first ring gear 63. The ECU 50 causes the first rotating machine MG1 and the second rotating machine MG2 to produce negative torque when running the vehicle forward, so that driving force is generated to run the vehicle 100 in the forward direction, against torque Tr of running resistance.

(HV-1 Mode)

As shown in FIG. 13, in the HV-1 mode, the brake BK is engaged, and the clutch CL is released. In the HV-1 mode, the first rotating machine MG1 produces MG1 torque and functions to receive reaction force against engine torque, so that engine torque is delivered from the first ring gear 63. The second carrier 74 is inhibited by the brake BK from being rotated, and functions to receive reaction force against MG2 torque.

(HV-2 Mode)

As shown in FIG. 13, in the HV-2 mode, the brake BK is released, and the clutch CL is engaged. As shown in FIG. 16, the HV-2 mode is a combined split mode in which the first rotating machine MG1, second rotating machine MG2, engine 1, and the output gear 6 are coupled in this order to a four-element planetary unit. In this embodiment, the respective rotational elements of the first planetary gear unit 60 and second planetary gear unit 70 are arranged in the nomographic chart, in the order of the first sun gear 61, second sun gear 71, first carrier 64 and second carrier 74, and the first ring gear 63 and second ring gear 73. The gear ratio of the first planetary gear unit 60 and the gear ratio of the second planetary gear unit 70 are determined so that the order of arrangement of the first sun gear 61 and the second sun gear 71 on the nomographic chart becomes the above-indicated order of arrangement.

In the HV-2 mode, the clutch CL is engaged, so that the first carrier 64 and the second carrier 74 are coupled to each other. Therefore, either one of the first rotating machine MG1 and the second rotating machine MG2 can receive reaction force, against power generated by the engine 1. The reaction force of the engine 1 can be received by one of the first rotating machine MG1 and the second rotating machine MG2, or both of them that distribute torque therebetween, thus making it possible to operate the hybrid vehicle 100 at a highly efficient operating point, and reduce restrictions, such as torque limits, due to heat. Accordingly, the efficiency of the hybrid vehicle 100 can be improved.

Since the HV-2 mode has two mechanical points on the high gear side, the transmission efficiency is advantageously improved during high-gear operation. The mechanical point is a mechanical transmission point, or a highly efficient operating point having no electric path.

(HV-3 Mode)

As shown in FIG. 13, in the HV-3 mode, the brake BK and the clutch CL are released. In the HV-3 mode, the second rotating machine MG2 is disconnected from the rest of the system, and the vehicle can run with the engine 1 and the first rotating machine MG1. Since the brake BK and the clutch CL are released in the HV-3 mode, it is possible to disconnect the second rotating machine MG2 from the power transmission path, and stop rotation thereof. For example, the HV-3 mode is selected when the vehicle runs at a high speed, so that reduction of the efficiency, which would occur due to high MG2 speed, can be curbed or prevented.

(Lubrication Control)

In this embodiment, the ECU 50 causes the first rotating machine MG1 to rotate the first carrier 64, when shifting from the MG2-EV running mode to the both MG-EV running mode. The ECU 50 performs lubrication control of the first planetary gear unit 60, according to the control flow shown in FIG. 7, for example. When a shift from the MG2-EV running mode to the both MG-EV running mode is requested, the ECU 50 rotates the first carrier 64, using torque of the first rotating machine MG1. The direction of rotation at this time may be the positive rotational direction or the negative rotational direction. As shown in FIG. 17, the ECU 50 of this embodiment sets MG1 torque as positive torque and rotates the first carrier 64 in the positive direction when shifting to the both MG-EV running mode. In the lubrication control, it is preferable to rotate the carrier 64 so that the carrier 64 makes a half turn to several turns, for example.

After rotating the first carrier 64, the ECU 50 starts the both MG-EV running mode. When starting the both MG-EV running mode, the ECU 50 sets MG1 torque as negative torque, and reduces the rotational speed of the first carrier 64, so that the rotational speed of the first carrier 64 becomes equal to the rotational speed (zero speed) of the second carrier 74, as shown in FIG. 18. With the rotational speeds thus made equal to each other, the clutch CL is engaged (coupled), and the both MG-EV running mode is started. After the first carrier 64 is rotated so as to lubricate the first pinion gears 64, the clutch CL may be half-engaged so that the rotational speed of the first carrier 64 is made equal to the rotational speed of the second carrier 74, and the clutch CL may be fully engaged so as to start the both MG-EV running mode.

First Modified Example of Each Embodiment

Lubrication Control During Running in Both MG-EV Running Mode

A first modified example may be applied to the above-described third embodiment and fourth embodiment. In the drive system 1-3, 2-1 for the hybrid vehicle in which rotation of the engine shaft (carrier 14, 64) is regulated by the friction engagement device, lubrication control may be performed during running in the both MG-EV running mode. For example, the drive system 2-1 for the hybrid vehicle according to the fourth embodiment may rotate the first carrier 64 by half-engaging the clutch CL, during running in the both MG-EV running mode, based on at least one of duration of the both MG-EV running mode, and the traveling distance in the both MG-EV running mode. As the duration or traveling distance in the both MG-EV running mode is longer, the first planetary gear unit 60 is more likely to suffer from insufficient lubrication. If the duration of the both MG-EV running mode reaches a predetermined time, for example, the ECU 50 rotates the first carrier 64 by half-engaging the clutch CL.

Figure 19:
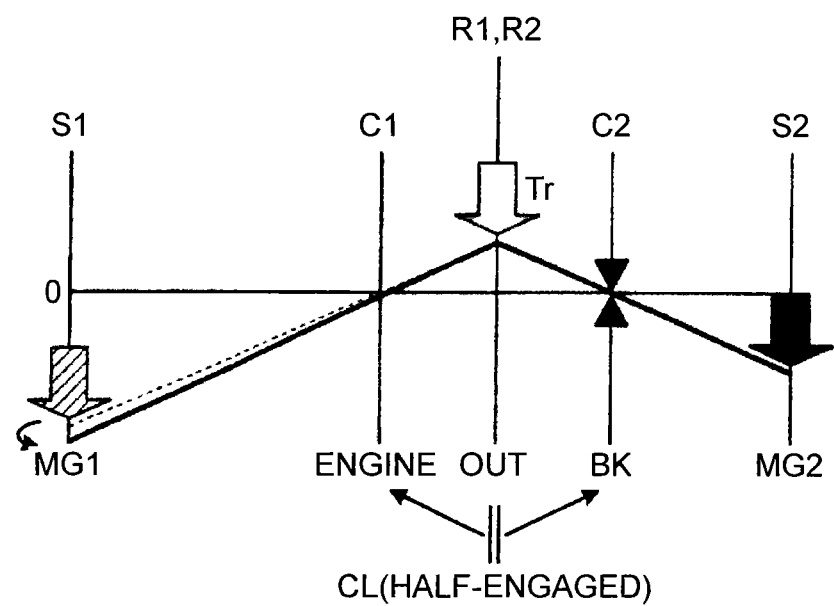
FIG. 19 is a nomographic chart showing lubrication operation during running in the both MG-EV running mode.
Figure 20:
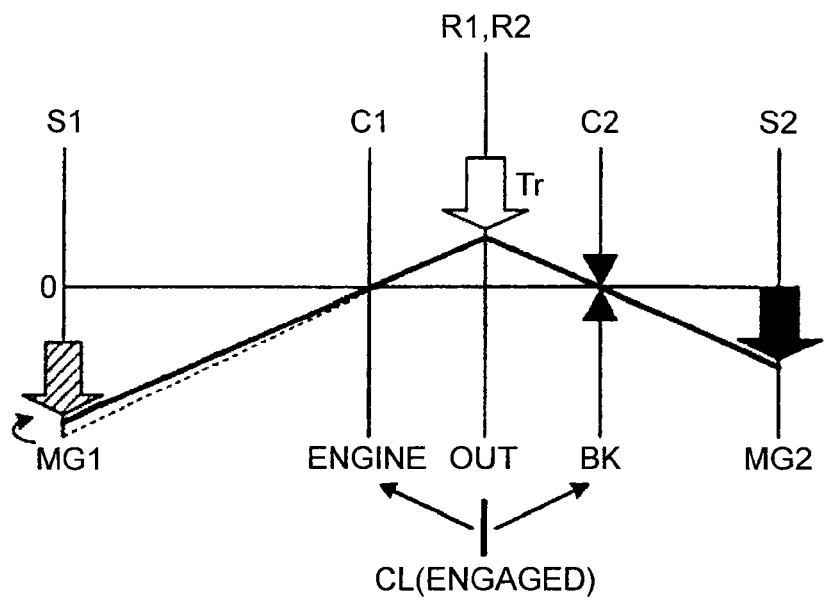
FIG. 20 is a nomographic chart showing returning operation from the lubricating operation during running in the both MG-EV running mode.

FIG. 19 is a nomographic chart showing lubrication operation during running in the both MG-EV running mode, and FIG. 20 is a nomographic chart showing returning operation from the lubricating operation during running in the both MG-EV running mode. To lubricate the first planetary gear unit 60 during running in the both MG-EV running mode as shown in FIG. 15, the ECU 50 half-engages the clutch CL as shown in FIG. 19. The ECU 50 reduces the engaging hydraulic pressure of the clutch CL, so as to cause the clutch CL to slip. As a result, the first carrier 64 rotates due to MG1 torque (negative torque), and the MG1 rotational speed is changed in the negative direction. The amount of rotation of the first carrier 64 at this time is preferably a half-turn to several turns. It is preferable to make the torque capacity of the clutch CL slightly smaller than the magnitude of the MG1 torque, so as to provide engaging force large enough to enable the first carrier 64 to start rotating. In this manner, a loss of driving force generated by the first rotating machine MG1 can be reduced.

After lubricating the first planetary gear unit 60 by rotating the first carrier 64, the ECU 50 fully engages the clutch CL. As a result, the rotational speed of the first carrier 64 becomes equal to 0, and the MG1 rotational speed is changed to a positive rotational speed, as shown in FIG. 20.

The duration of the both MG-EV running mode may be the traveling time for which the vehicle is kept running in the both MG-EV running mode, or the time elapsed from the time when the both MG-EV running mode is selected to the present time while the vehicle remains in the both MG-EV running mode. The above-indicated predetermined time as a threshold value used for determining the necessity of lubrication based on the duration of the both MG-EV running mode may be set to a shorter time in the case where the load in the both MG-EV running mode is large, than that in the case where the load is small. Namely, it may be determined whether the first planetary gear unit 60 is to be lubricated, based on the duration of the both MG-EV running mode and the running load of the both-MG EV running mode.

Also, the ECU 50 may determine whether the first planetary gear unit 60 is to be lubricated, based on the traveling distance in the both MG-EV running mode. If the traveling distance over which the vehicle is kept running in the both MG-EV running mode, namely, the distance over which the vehicle runs while rotation of the first carrier 64 is inhibited, reaches a predetermined distance, for example, the ECU 50 rotates the first carrier 64 by half-engaging the clutch CL, so as to lubricate the first planetary gear unit 60. The above-indicated predetermined distance may be set to a shorter distance in the case where the load in the both MG-EV running mode is large, than that in the case where the load is small. Namely, it may be determined whether the first planetary gear unit 60 is to be lubricated, based on the traveling distance in the both MG-EV running mode, and the running load of the both MG-EV running mode.

By half-engaging the clutch CL and rotating the first carrier 64, it is possible to lubricate the first planetary gear unit 60 without shifting from the both MG-EV running mode to another running mode. When the clutch CL is half-engaged, however, a slight torque loss may take place. When the ECU 50 determines that lubrication of the first planetary gear unit 60 is needed, it may lubricate the first planetary gear unit 60 by half-engaging the clutch CL when the required driving force is reduced, for example. If the clutch CL is half-engaged when the required driving force is reduced, the driveability is less likely or unlikely to be reduced due to a torque loss. Also, the ECU 50 may half-engage the clutch CL when the vehicle runs at a relatively light load so as to lubricate the first planetary gear unit 60. Also, the ECU 50 may increase the magnitude of MG2 torque, so as to compensate for reduction of output torque caused by half-engagement of the clutch CL.

The drive system 1-3 for the hybrid vehicle according to the third embodiment may perform lubrication control during running in the both MG-EV running mode, in the same manner as described above with regard to the drive system 2-1 for the hybrid vehicle by way of example. In this case, the ECU 50 causes the friction brake 22 to be half-engaged and slip during running in the both MG-EV running mode, so as to rotate the carrier 14 and lubricate the first planetary gear unit 10.

When the clutch CL or the friction brake 22 is half-engaged to slip, it is possible to cause the clutch CL or the friction brake 22 to slip by increasing MG1 torque, instead of reducing the engaging hydraulic pressure. In this manner, it is possible to rotate the carrier 14, 64, without giving rise to a torque loss.

Second Modified Example of Each Embodiment

A second modified example may be applied to the above-described third embodiment and fourth embodiment. In the third embodiment, when the vehicle shifts from the MG2-EV running mode to the both MG-EV running mode, the carrier 14 is rotated in a condition where the friction brake 22 is released. Instead, the friction brake 22 may be half-engaged, and the carrier 14 may be rotated with MG1 torque. In this manner, engagement of the friction brake 22 can be started earlier, as compared with the case where the carrier 14 is rotated in a condition where the friction brake 22 is released, and then the friction brake 22 is engaged. Accordingly, the MG1 torque can start being delivered from the ring gear 13 earlier.

The direction of rotation of the carrier 14 when it is rotated may be either direction, but may be the same negative rotational direction as the rotational direction of the first rotating machine MG1, for example. Namely, the MG1 torque may be set as negative torque, and the carrier 14 may be rotated in the negative direction. As a result, when the friction brake 22 is fully engaged after the carrier 14 is rotated, the vehicle can shift to the both MG-EV running mode without switching the direction of the MG1 torque. Since the MG1 torque starts being transmitted while the friction brake 22 is half-engaged, it is possible to curb or reduce shock at the time of shifting of the modes.

In the fourth embodiment, when the vehicle shifts from the MG2-EV running mode to the both MG-EV running mode, the first carrier 64 is rotated in a condition where the clutch CL is released. Instead, the clutch CL may be half-engaged, and the first carrier 64 may be rotated with MG1 torque. In this manner, engagement of the clutch CL may be started earlier, as compared with the case where the first carrier 64 is rotated in a condition where the clutch CL is released, and then the clutch CL is engaged. Accordingly, the MG1 torque can start being delivered from the first ring gear 63 earlier.

The direction of rotation of the first carrier 64 when it is rotated may be either direction, but may be the same negative rotational direction as the rotational direction of the first rotating machine MG1, for example. Namely, the MG1 torque may be set as negative torque, and the first carrier 64 may be rotated in the negative direction. As a result, when the clutch CL is fully engaged after the first carrier 64 is rotated, the vehicle can shift to the both MG-EV running mode without switching the direction of the MG1 torque. Since the MG1 torque starts being transmitted while the clutch CL is half-engaged, it is possible to curb or reduce shock at the time of shifting of the modes.

Third Modified Example of Each Embodiment

In the above-indicated first through fourth embodiments, lubrication of the planetary gear unit 10, 60 is conducted each time the vehicle shifts from the MG2-EV running mode to the both MG-EV running mode. Instead, lubrication of the planetary gear unit 10, 60 may be conducted at the time of shifting of the modes when a given condition is satisfied. The given condition may be a condition associated with, for example, the traveling time, traveling distance, stop time, or the like.

For example, even if it is determined that the vehicle should shift from the MG2-EV running mode to the both MG-EV running mode, the vehicle may shift to the both MG-EV running mode without performing lubrication control for rotating the carrier 14, 16, until the traveling time for which the vehicle runs without rotating the carrier 14, 64 reaches a predetermined traveling time. Also, even if it is determined that the vehicle should shift from the MG2-EV running mode to the both MG-EV running mode, the vehicle may shift to the both MG-EV running mode without performing lubrication control for rotating the carrier 14, 16, until the traveling distance over which the vehicle travels without rotating the carrier 14, 16 reaches a predetermined traveling distance. The predetermined traveling time and the predetermined traveling distance may be varied according to the running load. For example, the predetermined traveling time or predetermined traveling distance when the running load is large may be set to be shorter than the predetermined traveling time or predetermined traveling distance when the running load is small.

Fourth Modified Example of Each Embodiment

In the first through fourth embodiments, when the both MG-EV running mode is requested when the vehicle 100 is started for the first time after starting of the system, the vehicle 100 may be initially started in the MG2-EV running mode, and may shift to the both MG-EV running mode after the carrier 14, 64 is rotated by the first rotating machine MG1. In this manner, lubricating oil can be supplied to the pinion gears 12, 62 before the vehicle starts running in the both MG-EV running mode, and insufficient lubrication of the pinion gears 12, 62 is less likely or unlikely to occur in the both MG-EV running mode. The ECU 50 may select the MG2-EV running mode in response to a request for the both MG-EV running mode upon starting of the vehicle, and shift to the both MG-EV running mode after rotating the carrier 14, 64, only in a limited situation where the amount of lubricating oil on some parts of the pinion gears 12, 62 to be lubricated is likely to be reduced, for example.

The amount of lubricating oil on some parts of the pinion gears 12, 62 to be lubricated is likely to be reduced when the vehicle is started after it is parked for a long period of time, for example. When the vehicle is parked for a long period of time, the lubricating oil may come out of the lubricated parts of the pinion gears 12, 72, and the amount of lubricating oil may be reduced. Also, if the traveling time for which the vehicle runs without rotating the carrier 14, 16 is long, the amount of lubricating oil on the lubricated parts of the pinion gears 12, 62 is considered to be reduced. Also, when the traveling distance over which the vehicle runs without rotating the carriers 14, 64 is long, the amount of lubricating oil on the lubricated parts of the pinion gears 12, 62 is considered to be reduced.

Fifth Modified Example of Each Embodiment

Figure 21:
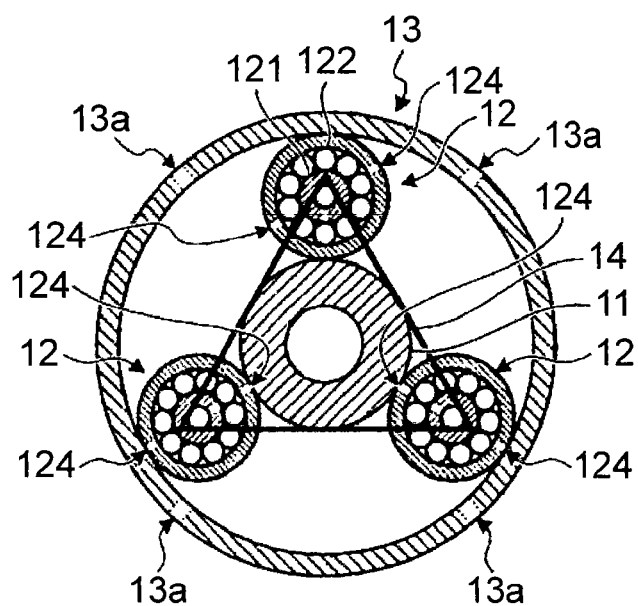
FIG. 21 is a cross-sectional view of a planetary gear unit according to a fifth modified example.
Figure 22:
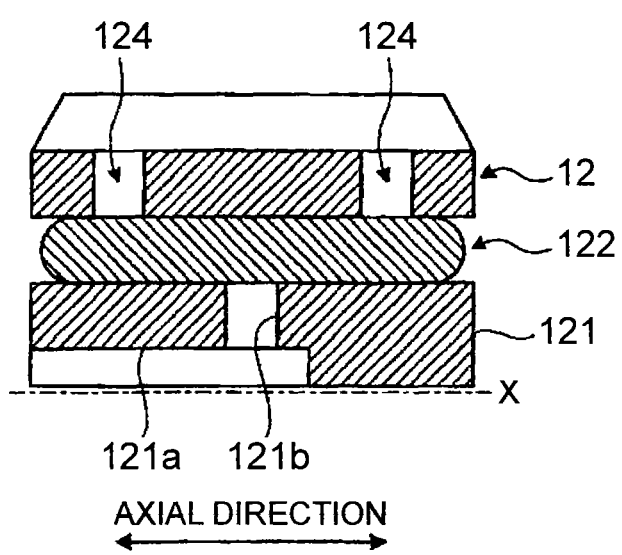
FIG. 22 is a cross-sectional view showing a principal part of a pinion gear according to the fifth modified example.

A fifth modified example of the first through fourth embodiments will be described. FIG. 21 is a cross-sectional view of a planetary gear unit according to the fifth modified example, and FIG. 22 is a cross-sectional view showing a principal part of a pinion gear according to the fifth modified example. FIG. 21 shows a cross-section corresponding to an A-A cross-sectional view of the planetary gear unit 10 of the first embodiment (see FIG. 1). Also, FIG. 22 shows a cross-sectional view of the pinion gear 12 taken in the axial direction.

As shown in FIG. 21 and FIG. 22, the pinion gears 12 are rotatably supported by pinion pins 121 via pinion bearings 122. The pinion pins 121 are supported by the carrier 14. The pinion pin 121 is formed with an axial oil passage 121a and a radial oil passage 121b. The axial oil passage 121a is an oil passage formed in the direction of the center axis X of the pinion pin 121. The radial oil passage 121b is an oil passage that communicates with the axial oil passage 121a and space radially outside the pinion pin 121. The radial oil passage 121b is formed in an axially middle portion of the pinion pin 121, for example. The lubricating oil is supplied from the oil pump 40 to the axial oil passage 121a, via an oil passage formed in the carrier 14.

Oil passages 124 are formed in the pinion gears 12. The oil passages 124 are formed in tooth bottom portions of the pinion gears 12, and extend in radial directions through the pinion gears 12. In this modified example, the oil passages 124 are located at positions different from that of the radial oil passage 121b as viewed in the axial direction, as shown in FIG. 22. For example, the oil passages 124 are located at one side and the other side of the radial oil passage 121b as viewed in the axial direction.

The oil passages 124 can guide the lubricating oil from the radially outer side of the pinion gear 12 to the radially inner side of the pinion gear 12, and can also guide the lubricating oil from the radially inner side of the pinion gear 12 to the radially outer side of the pinion gear 12. For example, when the lubricating oil coming from the mating ring gear 13, or other parts than the axis is brought into contact with the pinion gears 12, the lubricating oil can be supplied to tooth surfaces of the pinion gears 12, and the pinion bearings 122, via the oil passages 124. Thus, losses of the pinion gears 12 can be reduced. Also, it is possible to continue the both MG-EV running mode for a long time, without performing lubrication control by rotating the carrier 14.

Also, the radial oil passage 121b and the oil passages 124 are arranged to be displaced or spaced from each other in the axial direction, so that the lubricating oil guided via the oil passages 124 is prevented from flowing directly into the radial oil passage 121*b*. Accordingly, a wide range of the pinion bearing 122 can be appropriately lubricated.

As shown in FIG. 21, the oil passages 124 may be provided at two or more circumferential locations of the pinion gear 12. Also, in this modified example, oil passages 13*a* are formed in the ring gear 13. The oil passages 13*a* communicate with space on the radially inner side of the ring gear 13 and space on the radially outer side thereof. For example, if the lubricating oil stirred up by the differential gear 29 is deposited on the outer circumferential surface of the ring gear 13, the oil is guided to the radially inner side of the ring gear 13 via the oil passages 13*a*. As a result, the lubricating oil is supplied to the radially inner side of the ring gear 13, so as to lubricate the pinion gears 12 and the sun gear 11.

When the fifth modified example is applied to the drive system 2-1 for the hybrid vehicle of the above-described fourth embodiment, oil passages like the oil passages 13*a* may be formed in a cylindrical member on which the first ring gear 63, second ring gear 73 and the output gear 6 are disposed, and oil passages like the oil passages 124 may be formed in the first pinion gears 62 and the second pinion gears 72, for example.

While the engine 1 is installed as an engine on the vehicle 100 in each of the above-described embodiments and modified examples, an engine other than the engine 1 may be installed. Also, the planetary gear units 10, 60, 70 are not limited to those illustrated above, but may be of a double-pinion type, for example.

The contents disclosed in the above-described embodiments and modified examples may be combined as appropriate and implemented.

EXPLANATION OF REFERENCE NUMERALS

1-1, 1-2, 1-3, 2-1 drive system for hybrid vehicle
1 engine
10 planetary gear unit
11 sun gear
12 pinion gear
13 ring gear
14 carrier
20 one-way clutch
32 drive wheel
40 oil pump
50 ECU
60 first planetary gear unit
70 second planetary gear unit
100 vehicle

The invention claimed is:

1. A drive system for a hybrid vehicle, the drive system comprising:
   a planetary gear unit including a sun gear, a carrier, and a ring gear;
   a first rotating machine connected to the sun gear;
   an engine connected to the carrier;
   a second rotating machine connected to the ring gear;
   drive wheels connected to the ring gear;
   a regulating mechanism that regulates rotation of the carrier; and
   an ECU configured to:
      control, as a first running mode, the second rotating machine such that the hybrid vehicle runs using the second rotating machine as a power source while the regulating mechanism inhibits rotation of the carrier;
      control, as a second running mode, the first rotating machine and the second rotating machine such that the hybrid vehicle runs using the first rotating machine and the second rotating machine as power sources while the regulating mechanism inhibits rotation of the carrier; and
      control the first rotating machine and the regulating mechanism such that the carrier is rotated temporarily by the first rotating machine when the hybrid vehicle shifts from the first running mode to the second running mode.

2. The drive system according to claim 1, wherein the regulating mechanism is a friction engagement device.

3. The drive system according to claim 1, wherein the regulating mechanism is a one-way clutch.

4. The drive system according to claim 2, wherein the ECU is configured to control the friction engagement device so as to be half-engaged and control the first rotating machine such that the carrier is rotated by the first rotating machine, when the hybrid vehicle shifts from the first running mode to the second running mode.

5. The drive system according to claim 2, wherein the ECU is configured to control the friction engagement device so as to be half-engaged and control the first rotating machine such that the carrier is rotated by the first rotating machine, based on at least one of a duration of the second running mode and a traveling distance in the second running mode while the hybrid vehicle runs in the second running mode.

6. The drive system according to claim 1, further comprising:
   an oil pump that rotates in association with the carrier and supplies a lubricating oil to the planetary gear unit, wherein
   the ECU is configured to control the first rotating machine such that the carrier is rotated by the first rotating machine and the oil pump supplies the lubricating oil to the planetary gear unit when the hybrid vehicle shifts from the first running mode to the second running mode.

* * * * *